United States Patent [19]

Takano et al.

[11] Patent Number: 4,740,191

[45] Date of Patent: Apr. 26, 1988

[54] POWER TRANSMISSION SYSTEM

[75] Inventors: Hiroshi Takano, Miki; Mu Matsuo, Shizuoka, both of Japan

[73] Assignee: Mitsuboshi Belting Ltd., Kobe, Japan

[21] Appl. No.: 30,725

[22] Filed: Mar. 26, 1987

[30] Foreign Application Priority Data

Mar. 27, 1986 [JP] Japan ................................. 61-70343

[51] Int. Cl.$^4$ ............................................. F16H 11/02
[52] U.S. Cl. ......................................... 474/69; 474/11; 474/17; 474/72
[58] Field of Search ...................... 474/69, 72, 73, 11, 474/17, 8, 28; 74/689

[56] References Cited

U.S. PATENT DOCUMENTS 4,467,669  8/1984  Kawamoto ..................... 474/72 X
4,531,927  7/1985  Cadée ............................ 474/11 X
4,583,423  4/1986  Hahne ........................... 474/28 X Primary Examiner—Stephen J. Novosad
Assistant Examiner—Thuy M. Bui
Attorney, Agent, or Firm—Wood, Dalton, Phillips, Mason & Rowe

[57] ABSTRACT

An adjustable speed automatic transmission includes a variable speed pulley mechanism, a fixed speed ratio drive mechanism and a plurality of clutches in combination. The clutches are selectively engaged to control ouput speed in a low speed range by coupling the variable speed pulley mechanism and the fixed speed ratio drive mehcanism between an input and an output shaft. Alternatively, in a high speed range the clutches are selectively engaged to drive the output shaft directly from the input shaft.

34 Claims, 3 Drawing Sheets

POWER TRANSMISSION SYSTEM

FIELD OF THE INVENTION

The present invention relates to a power transmission system, and more specifically, to an adjustable speed transmission for automobiles, construction equipment, agricultural equipment, ships and the like.

BACKGROUND OF THE INVENTION

Automatic transmissions have been utilized for various drive systems, such as in automobiles to allow for ease in driving. The demand for such an automatic transmission has been accordingly increasing from year to year. Conventional automatic transmissions utilize fluid torque converter systems. However, such a system is disadvantageous in many respects such as poor power transmission efficiency and complicated construction which leads to higher production costs.

Conventional V-belt type transmissions have been utilized as an alternative. In conventional belt-type transmissions, it is necessary to employ pulleys whose effective pitch diameter is small in order to obtain a large transmission ratio. For example, if maximum torque is required to drive the automobile, the effective pitch diameter of a driver speed change pulley must be small as compared to that of a driven speed change pulley so that the reduction ratio is increased. This is required due to the fact that in order to obtain a high speed, it is necessary to use a driver pulley whose diameter is large and a driven pulley whose diameter is small, which causes a V-belt spanned between the pulleys to rotate at a high speed. Therefore, it is necessary to adjust the effective pitch diameter of the driver pulley so that the V-belt may be rotated at a maximum allowable limit. Theoretically, the minimum diameter of the driven pulley must be larger than the minimum allowable limit. Inevitably, in such a conventional V-belt type power transmission system, a narrow speed change range results.

The present invention has been developed to overcome the above-described problems of prior power transmission systems.

SUMMARY OF THE INVENTION

In accordance with the present invention, an adjustable speed transmission is provided which utilizes a variable speed pulley mechanism in combination with a plurality of clutches for selectively driving an output shaft directly from an engine output shaft or using the variable speed pulley, to control speed over a broad range.

Broadly, there is disclosed herein an adjustable speed transmission for driving an output shaft from an input shaft. The transmission includes a variable speed pulley drive mechanism and a first clutch for selectively connecting the pulley drive mechanism to an input drive shaft. A second clutch selectively connect the pulley drive mechanism to a fixed speed ratio drive mechanism. A third clutch includes means for selectively connecting the input drive shaft to an output shaft with the second clutch disconnecting the fixed speed ratio drive mechanism from the variable speed pulley drive mechanism.

The engine output shaft is coupled to the input of the first clutch. The output side of the first clutch includes a first cylindrical shaft rotatable concentrically about the engine output shaft. A driver adjustable speed pulley is coupled to the first cylindrical shaft. A driven V-belt type speed change pulley is integrally mounted with an intermediate shaft and is disposed opposite the driver pulley. A V-belt spans between the speed change pulleys. These pulleys comprise the variable speed pulley drive mechanism.

The input side of the second clutch is also coupled to the engine output shaft. The output side of the second clutch includes a second cylindrical intermediate shaft rotatable concentrically about the engine output shaft. Reversible gear means are coupled between the second cylindrical shaft and an output shaft for driving the output shaft directly or reversely therefrom.

The input side of the third clutch is coupled to the intermediate shaft. The output side of the third clutch includes a third cylindrical intermediate shaft rotatable concentrically about the intermediate shaft. Engaging members are provided both on the second and third cylindrical shafts. A chain or belt spans between the engaging members for transferring power between the second and third cylindrical shafts.

Accordingly, variable speed power is transmitted from the engine output shaft to the transmission output shaft utilizing the variable speed pulley drive mechanism to control speed if the first and third clutches are engaged and the second clutch is disengaged. Alternately, power is transmitted directly from the engine output shaft to the transmission output shaft when the second clutch is engaged and first and third clutches are disengaged.

It is a feature of the present invention that the variable speed pulley drive mechanism comprises an infinitely adjustable mechanism.

It is an additional feature of the present invention that the reversible gear means includes a first gear continuously meshed with the fixed speed ratio drive mechanism, a second gear and means for causing the second gear to selectively (a) drive the first gear for driving the output drive shaft in the first rotational direction, and (b) drive the output drive shaft in a second rotational direction opposite to the first direction.

It is yet another feature of the present invention that the clutches comprise friction clutches.

It is still an additional feature of the present invention that said first friction clutch may be eliminated whereby the driver side pulley is coupled directly to the engine output shaft.

Further features and advantages of the invention will readily be apparent from the specification and from the drawings.

DESCRIPTION OF THE PREFERRED EMBODIMENT

Figure 1:
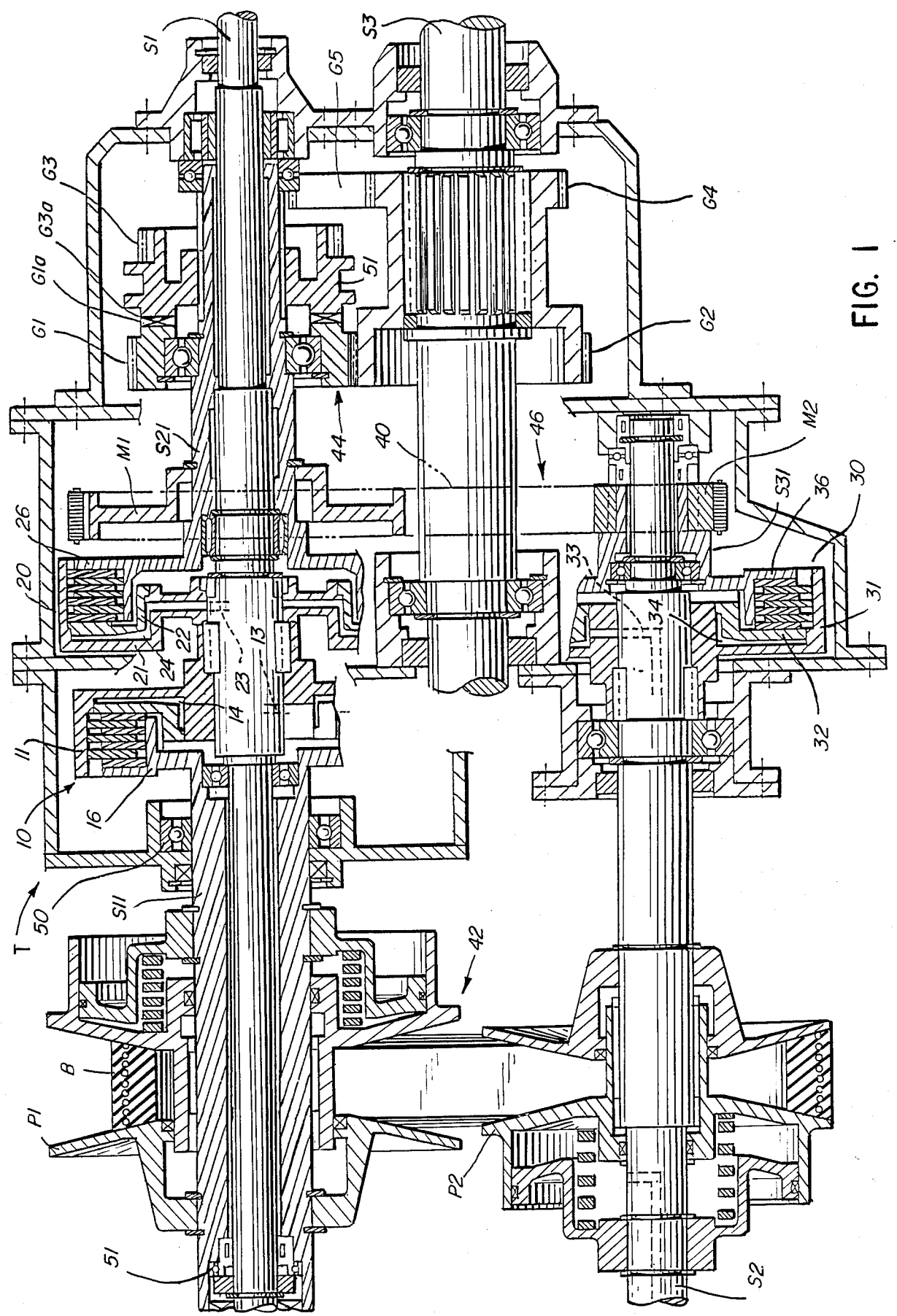
FIG. 1 is a schematic view showing one embodiment of a power transmission system according to the present invention.

Referring to FIG. 1, a power transmission system T according to the present invention is illustrated. The power transmission system T includes an input shaft S1 extending from an engine output shaft. A first friction clutch 10 coacts with the input shaft S1 and includes an input-side clutch member 11 and an output-side clutch member 16. The input-side clutch member engages and is rotatable with the input shaft S1. The output-side clutch member 16 includes a cylindrical intermediate shaft S11 rotatable concentrically about the input shaft S1.

A second friction clutch 20 coacts with the input shaft S1 and includes an input-side clutch member 21 and an output-side clutch member 26. The input-side clutch member is coupled to the input shaft S1 and is rotatable therewith. The output-side clutch member 26 includes a cylindrical intermediate shaft S21 rotatable concentrically about the input shaft S2.

A driver V-belt type speed change pulley P1 is integrally mounted with the first cylindrical shaft S11. A driven V-belt type speed change pulley P2 is integrally mounted with an intermediate shaft S2 and is disposed opposite the driver pulley P1. A V-belt B spans between the speed change pulleys P1 and P2. The pulleys P1 and P2 and belt B comprise a variable speed pulley input drive mechanism 42.

A third friction clutch 30 coacts with the intermediate shaft S2 and includes an input-side clutch member 31 and an output-side clutch member 36. The input-side clutch member is coupled to the intermediate shaft S2 and rotatable therewith. The output-side clutch member 36 includes a third cylindrical intermediate shaft S31 rotatable concentrically about the intermediate shaft S2. Engaging members M1 and M2 are provided with the cylindrical shafts S21 and S31, respectively, so that power may be transmitted therebetween. In the illustrated embodiment, the engaging members M1 and M2 comprise sprockets, and a chain 40 is spanned between sprocket M2 integrated with cylindrical shaft S31 and sprocket M1 integrated with cylindrical shaft S21. The first and second sprockets M1 and M2 and the chain 40 collectively comprise a fixed speed ratio driver mechanism 46.

Alternatively, the above-described sprockets M1 and M2 may be replaced with toothed pulleys between which a toothed belt is spanned. A V-belt may also be spanned between pulleys, so that power transmission can be effective by means of friction or gears.

A gear G1 is rotatable with respect to the second cylindrical shaft S21. A gear G1a is coupled to and disposed coaxially with the gear G1 and is engaged with a gear G3a which is coupled to and disposed coaxially with a gear G3. The gear G3 is engaged with the second cylindrical shaft S21 by a spline or key, such that the gear G3 moves freely in the direction of thrust integrally with the second cylindrical shaft S21. This construction enables the power transmission system to be provided with normal/reverse speed output.

Figure 2:
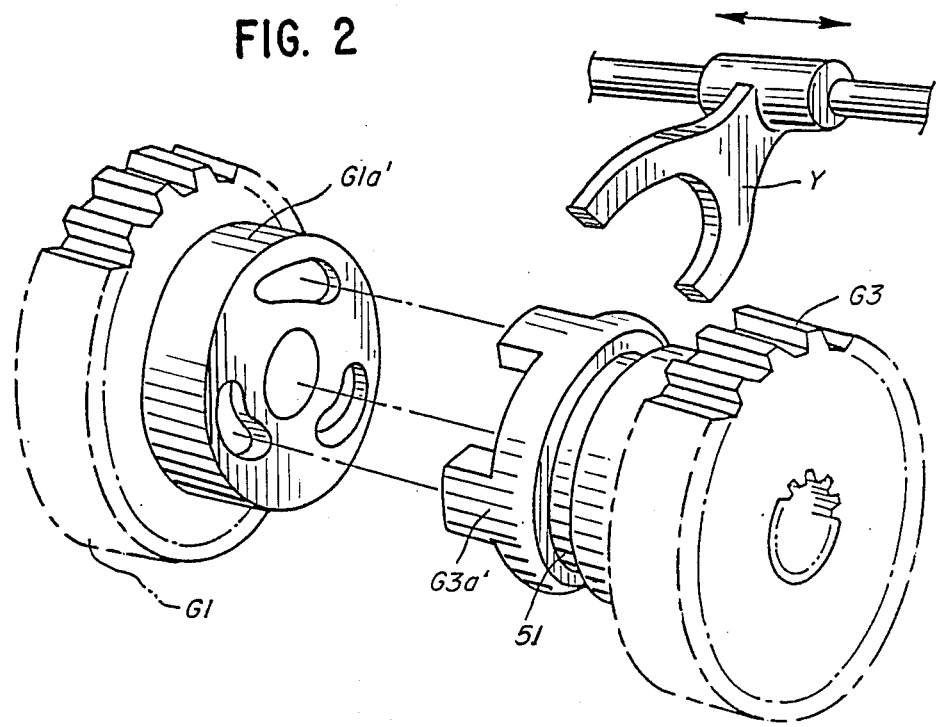
FIG. 2 is an exploded view of a dog clutch forming part of a reversible gear means according to one embodiment of the present invention.

Referring to FIG. 2, gears G1a and G3a may be replaced with a dog clutch consisting of clutch members G1a' and G3a' which are selectively engaged or disengaged to or from one another according to the axial position of a yoke Y which engages a shoulder 51 in gear G3a' to selectively axially position same.

A gear G2 engages an output shaft S3 via a spline or key. The torque of the second cylindrical shaft S21 may be transmitted to the output shaft S3 by the engagement of the gears G1 and G2. A gear G4, coupled to gear G2, is similarly integrally rotatable with respect to the output shaft S3. An idle gear G5 is interposed adjacent and engages the gear G4 so that power can be transmitted from gear G3 to gear G4 when the yoke Y engaging the shoulder 51 of gear G3 axially moves gear G3 so that it engages gear G5. In this latter axial position, gears G1 and G3 are disengaged. The gears G1–G5 collectively comprise a reversible gear means 44. Accordingly, if gears G1 and G2 are engaged, then the second cylindrical shaft S21 drives the output shaft S3 directly through gears G1 and G2. Alternatively, if the gears G1 and G3 are disengaged, then the second cylindrical shaft S21 drives the output shaft S3 reversely through gears G3, G5 and G4, while gear G1 rotates freely.

Figure 3:
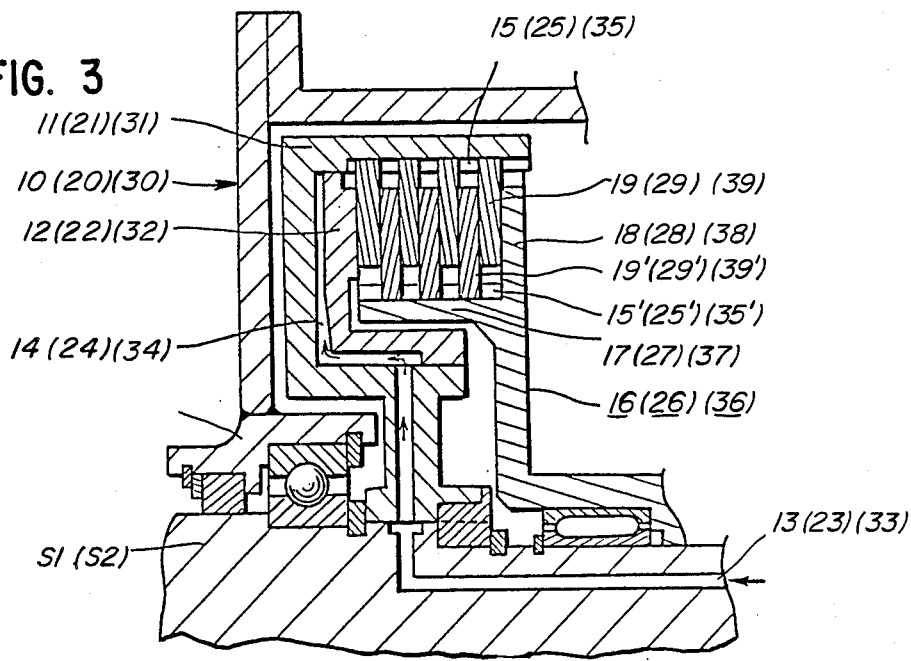
FIG. 3 is a schematic cross-sectional view of a friction clutch according to the present invention.

Referring to FIG. 3, there is shown a multiple disc friction clutch 10 to be used in conjunction with the power transmission system according to the present invention. It should be noted that the second and third friction clutches are identical in construction to the first friction clutch, and therefore will not be described in detail. However, reference numerals in FIG. 3 in parenthesis indicate corresponding reference numerals for second and third friction clutches 20 and 30, with the first digit thereof indicating the first, second or third friction clutch.

The input side clutch member 11 comprises a cylindrical member having a terraced surface and mounted concentrically on and integrally with the input shaft S1. A spline or key groove 15 is provided on the inner circumferential surface of the cylindrical member. A sliding member 12 forms a pressure chamber 14 inside the input side member 11 and is slidably housed therein. Oil or air is drawn through a passageway 13 in the input shaft S1 into the pressure chamber 14.

The output-side clutch member 16 includes a supporting member having a terraced surface that is provided with a cylindrical member 17 and a sidewall member 18. The output-side clutch member 16 is mounted opposite to the input-side clutch member 11 on the input shaft S1. A spline or key groove 15' is provided on the outer surface of the output-side cylindrical member 17.

A plurality of sets of friction discs 19 and 19' includes splines or key grooves to engage with the splines or key grooves of the cylindrical members 11 and 17. Thus, the disc 19 and 19', respectively, are disposed adjacent and alternately from each other between the internal surface of the cylindrical member of the input-side clutch member 11 and the outer surface of the cylindrical member 17 and the sidewall 18 of the output-side clutch member 16.

If oil or air is forced into the pressure chamber 14 via the passageway 13, then a frictional force is generated between the friction discs 19 and 19' to set the clutch "ON", whereby input shaft S1 and the first cylindrical shaft S11 of the output-side friction clutch member 16 are engaged with one another. In the absence of such oil or air pressure, the clutch is set to "OFF" and the input shaft S1 and the first cylindrical shaft S11 are disengaged.

The friction clutches described above are multiple disc-type clutches consisting of a plural number of sets of friction discs 19 and 19', but this may be replaced with a single disc clutch. Alternatively, the friction clutches 10 may be replaced with other types of clutches such as fluid coupling clutches, powder clutches, electromagnetic clutches and dry fluid coupling clutches. Preferably, the clutches are of the type which permit a certain degree of slippage in order to absorb the shock caused by the engagement and disengagement of clutch members.

The operation of the above-described power transmission system according to the present invention will be described hereinafter.

Initially, the first friction clutch 10 and the third friction clutch 30 are set to "ON" and the second friction clutch 20 is set to "OFF". Accordingly, the torque of the input shaft S1 extending from the engine output shaft is transmitted to the first friction clutch 10, whereby the torque is transmitted through the first cylindrical shaft S11 to the driver pulley P1. The second cylindrical shaft S21 rotates freely with respect to the input shaft S1 since the second friction clutch 20 has been set to "OFF". Accordingly, the torque of input shaft S1 is not transmitted directly to the second cylindrical shaft S21.

Power transmitted to the driver pulley P1 is transmitted to the intermediate shaft S2 through the V-belt B and the driven pulley P2. Since the third friction clutch 30 is set to "ON", power is transmitted from the intermediate shaft S2 through the third cylindrical shaft S31 to the second sprocket S2. Power transmitted to the second sprocket M2 is transmitted to the first sprocket M1, and thus the second cylindrical shaft S21. The power transmitted to the first sprocket M1 is further transmitted to the output shaft S3 through the reversible gear means 44.

Subsequently, the first and third friction clutches 10 and 30 are set to "OFF", and the second friction clutch 20 is set to "ON". When the second friction clutch 20 is set to "ON" then the torque of the input shaft S1 is transmitted to the second friction clutch 20, whereby the torque is transmitted directly to the second cylindrical shaft S21. Power transmitted to the second cylindrical shaft S21 is further transmitted to the output shaft S3 through the reversible gear means 44.

If all three friction clutches 10, 20 and 30 are set to "OFF", no power is transmitted from the input shaft S1 to the output shaft S3. Accordingly, no power is transmitted to the pulleys P1, P2 or to the V-belt B.

According to the above-described power transmission system, the output from the engine shaft is transmitted by either of the following two modes: in a belt drive mode power is transmitted using the belt drive system, i.e., power is transmitted from the input shaft S1 through the first friction clutch 10, the first cylindrical shaft S11, the driver pulley P1, the belt B, the driven pulley P2, the intermediate shaft S2, the third friction clutch 30, the third cylindrical shaft S31, the second sprocket M2, the chain 40, the first sprocket M1, the second cylindrical shaft S21, and thereafter to the output shaft S3 in either the forward or reversed direction through the reversible gear means 44; or in a direct drive mode, i.e., power is transmitted from the input shaft S1 through the second friction clutch 20, the second cylindrical shaft S21, and thereafter through the reversible gear means 44 to the output shaft S3.

By setting the first friction clutch 10 and third friction clutch 30 to "OFF" when power is transmitted in the direct drive mode, no power is transmitted to the V-belt B. Therefore, the life of the V-belt B can be increased. More specifically, if the input shaft S1 is rotating at a high speed when power is transmitted in the direct drive mode, no load is applied to belt B thereby improving the durability of the belt B which causes the power transmission system to be more durable.

In operation, initial speed changes in an automatic transmission from first speed through third speed are accomplished with the first and third friction clutches "ON" and the second friction clutch "OFF" whereby the pulley input drive mechanism 42 carries out initial speed changes from the first through third speeds. A fourth speed is obtained by turning the first and third friction clutches 10 and 20 "OFF" and the second friction clutch 20 "ON" whereby power is transmitted directly from the input shaft S1 to the output shaft S3.

Figure 4:
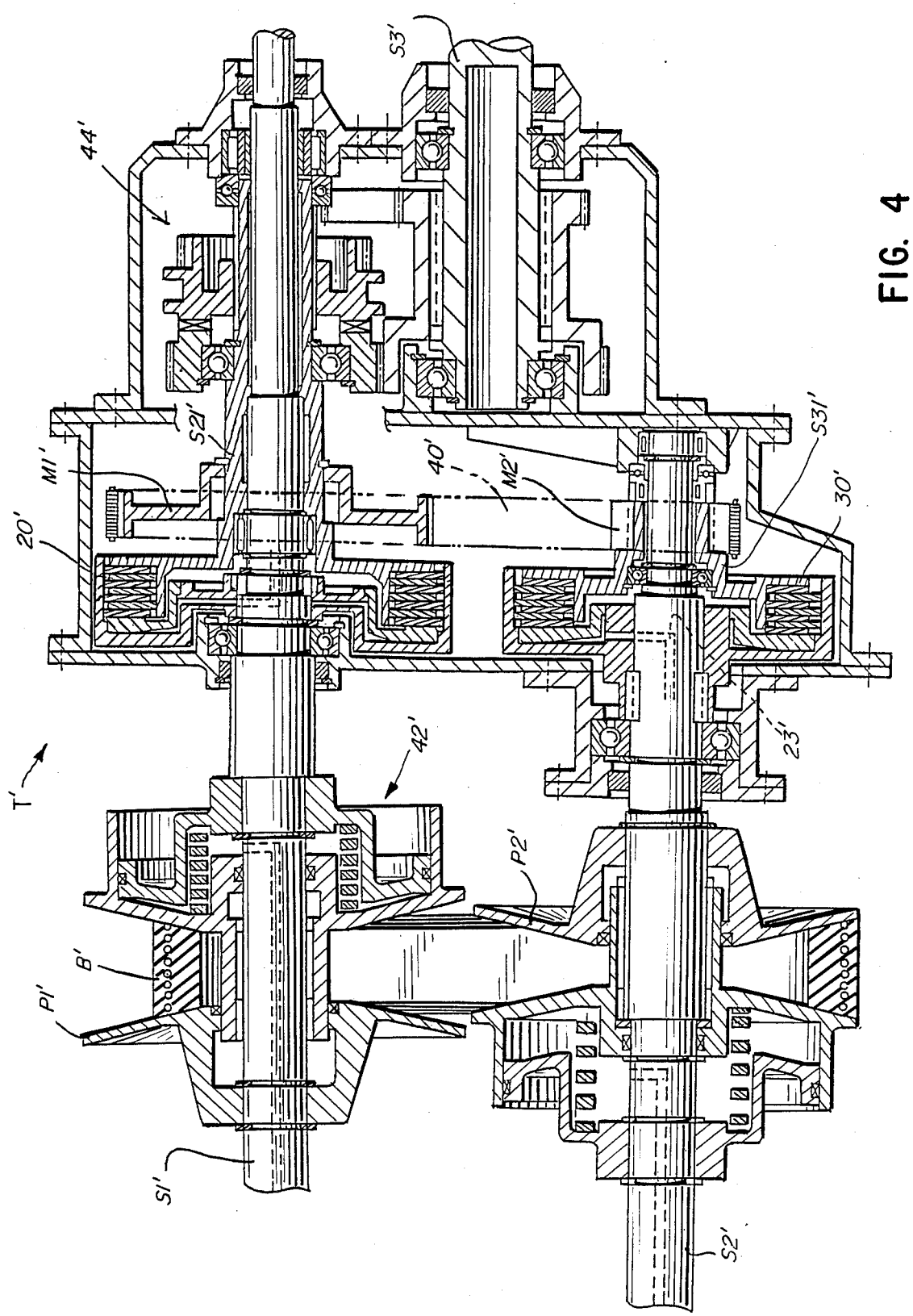
FIG. 4 is a schematic view showing another embodiment of a power transmission system according to the present invention.

Referring to FIG. 4, an alternative embodiment of a power transmission system T' according to the present invention is illustrated. Construction of the power transmission system T' illustrated in FIG. 3 is the same as that described with reference to FIG. 1, above, with the exception that the first friction clutch 10 and the first cylindrical shaft S1' are eliminated and the driver speed change pulley P1' is directly connected to the input shaft S1'. Note, primed reference numerals represent like components, as previously described with reference to FIGS. 1-3.

An input shaft S1' extends from an output shaft of an engine. A driver V-belt type speed change pulley P1' is integrally mounted with the input shaft S1'. A driven V-belt type speed change pulley P2' is integrally mounted with an intermediate shaft S2' and is disposed opposite the driver pulley P1'. A V-belt B' spans between speed change pulleys P1' and P2'. The pulleys P1' and P2' and belt B' comprise a variable speed pulley input drive mechanism 42'.

A second friction clutch 20' connects the input shaft S1' to a second cylindrical shaft S21'. Likewise, a third friction clutch 30' connects the intermediate shaft S2' to a third cylindrical shaft S31'. The construction of the second and third friction clutches 20' and 30' are the same as those previously described with reference to FIG. 3.

First and second sprockets M1' and M2' are mounted on the second and third cylindrical shafts S21' and S31' respectively. A chain 40' spans between the sprockets M1' and M2', whereby power is transmitted between the sprockets M1' and M2', and thus the second and third cylindrical shafts S21' and S31'. Power is transmitted between the second cylindrical shaft S21' and an output shaft S3' by a reversible gear means 44' similar to that previously discussed with regard to the first embodiment.

In operation, in the low speed range, power is transmitted by setting the third friction clutch "ON" and the second friction clutch "OFF". Accordingly, the torque of the engine is transmitted from the input shaft S1' through the driver pulley P1', the belt B', the driven pulley P2', the intermediate shaft S2', the third friction clutch 30', the third cylindrical shaft S31', the second sprocket M2', the chain 40,' the first sprocket M1', the second cylindrical shaft S21' and the reversible gear means 44' to the output shaft S3'. In this belt drive mode, the speed of the output shaft S3' is infinitely variably changed by the pulleys P1' and P2'.

In the high speed range, power is transmitted in a direct drive mode by setting the second friction clutch 20' to "ON" and the third friction clutch 30' to "OFF". Accordingly, power is transmitted from the input shaft S1' directly through the second friction clutch 20', the second cylindrical shaft S21' and the reversible gear means 41' to the output shaft S3'. The pulleys P1' and P2', the belt B' and the intermediate shaft S2' run idly since the third friction clutch 30 has been set to "OFF".

Modifications to the power transmission system according to the present invention may be made as will be obvious to those skilled in the art. For example, the components of the power transmission system such as the input pulley drive mechanism, the clutches, the sprockets and gears may be contained separately in individual housings instead of being contained in a common housing. Accordingly, the components are connected to each other in series, functionally by conventional power transmission means known in the art such as shafts, gears, and belts. However, the distances between such components may be increased considerably, or an intermediate shaft may be used depending on the layout of the automobile, agricultural machine, ship, industrial machine, or other type of device with power transmission system according to the present invention is utilized on. Thus, when the above-described arrangement is utilized, the power transmission function can be obtained through the combination of the speed change ratio of the V-belt transmission system and direct coupling between an input shaft and the output shaft, according to the speed change range of the power transmission system.

Preferable speed change ratios with respect to constituent of the power transmission system of the present invention such as pulleys, engaging members will be described hereinafter.

Ignoring the reduction ratio of gears for normal/reverse rotation and assuming that the variation range of the speed change ratio of pulleys is JB1—JB2 (JB1>JB2), that the reduction ratio of the engaging members is JG and that the rotational speed of the input shaft S1 extending from an engine output shaft is N, the rotational speed of the output shaft S3, is given as follows: When speed change is carried out by means of the belt drive system;

$$N \frac{1}{JB1 \times JG} - N \frac{1}{JB2 \times JG}$$

When speed change is carried out by direct drive system;

$$N$$

By selecting the equation $$N \frac{1}{JB2 \times JG} = N \text{ (consequently, } JB2 \times JG = 1\text{)}$$

a power transmission system which causes no discontinuity in the output shaft rotation in the speed change range can be obtained, although the total range of speed change ratio is relatively small. The speed change range is expressed as follows:

$$N \frac{1}{JB1 \times JG} - N$$

In this case, the shock which normally occurs when the friction clutches are operated to switch from the belt drive system to the direct drive system and vice versa is drastically reduced.

When the value of $JB2 \times JG$ is given as $$N \frac{1}{JB2 \times JG} < N, \text{ then}$$

$$JB2 \times JG > 1, \text{ and}$$

a wide speed change range can be obtained although a shock occurs when the belt drive system is switched to the direct drive system.

Consequently, the relationship between JB2 and JG should be determined depending on use and purpose. In applying the power transmission system according to the present invention to an automobile, it is preferable to select the following range:

$$1 < JB2 \times JG \leq 1.7$$

preferably, $1.3 < JB2 \times JG < 1.55$

Applicant conducted running tests using the power transmission system according to the present invention installed in an automobile. In the tests, the above-described value of $JB2 \times JG$ was varied. The results showed that when the value of $JB2 \times JG$ was less than 1.55, the shock which previously occurred due to acceleration at the time of speed switching was not felt, whereas when the value of $JB2 \times JG$ was greater than 1.55, a slight shock was felt to some extent, however, when it was less than 1.7, the shock felt was no greater than that felt in an automobile in which speed change is effected using a manual transmission.

Specific values obtained in the tests are shown below. Assuming that the range of speed change ratio of the first-step to the third-step speeds obtained by the belt drive system correspond to the first-step to the fourth-step speeds available in normal manual gear transmission systems and the fourth-step speed obtained by the direct drive system corresponds to that adopted in normal gear transmission, specific values are selected as follows:

$$JB1 = 1.6,$$
$$JB2 = 0.62, \text{ and}$$
$$JG = 2.30$$

In this case, the rotational speed of the second cylindrical shaft S21 is obtained as follows:

When speed change is carried out by the belt drive system;

$$0.2717N - 0.701N$$

When speed change is carried out by the direct drive system;

$$N$$

From the foregoing, the speed change ratio obtained by the direct drive system to the highest speed obtained by the belt drive system is as follows:

$$N/0.701N = 1.426$$

Consequently, the maximum speed change ratio obtained by switching from the belt drive system to the direct drive system is $$N/0.2717N = 3.681$$

Accordingly, the speed change ratio range obtained according to this system is the same as that obtained by a normal manual gear transmission system.

In order to increase the maximum speed change ratio to be obtained by the power transmission system according to the present invention, an over-top transmission gear is disposed between shaft the second cylindrical shaft S21' and the output shaft S3 in FIG. 4, or the over-top gear transmission is mounted on a rear portion of the output shaft S3'.

Advantage of the Invention

The following advantages can be obtained by the power transmission system according to the present invention, comprising the belt speed change system and the direct drive system wherein when power is transmitted by the direct drive system, the belt drive system is not operated (belt is not driven) or no load is applied to the belt. (1) The belt speed change ratio can be reduced when the following equation is satisfied in the relation between the highest speed to be obtained by the belt drive system and the direct drive system.

$JB2 \times JG > 1$ (more favorably, $1.3 < JB2 \times JG < 1.55$) More specifically, it is possible to design a belt engaged with a pulley so that the effective minimum diameter of the belt is relatively large and the effective maximum diameter is small. (When a necessary speed change ratio is carried out by the belt drive system only, speed change ratio becomes greater and the ratio of the effective maximum diameter of a pulley to the effective minimum diameter thereof becomes greater), so that the durability of the belt can be increased and the response of the power transmission system is improved when speed change is carried out by the belt drive system.

(2) By switching the highest speed range to be obtained by the belt drive system to the direct drive system, a kick-up efficiency obtained by normal automatic transmission cars can be obtained. Further, the kickdown efficiency is also obtained by switching the speed range to be obtained by the direct drive system to the highest speed range to be obtained by the belt drive system. In both operations described above, the following equations is utilized.

$JB2 \times JG > 1$ (more favorably, $1.3 < JB2 \times JG < 1.55$).

(3) When the belt drive system is switched to the direct drive system, as described above, friction clutches serve to stop the rotation of pulleys and the belt, or no load is applied thereto, whereby the durability of the belt can be increased to a great extent.

The following procedure is taken when an automobile is started.

(1) With all of the clutches set to "OFF", the rotation of shaft S1 extending from the engine output shaft is gradually increased.

(2) In the first embodiment, either first clutch 10 or third clutch 30 is set to "ON", and the friction clutch which is "OFF" is set to "ON" by gradually increasing the thrust of a cylinder or the clutches are set to "ON" simultaneously by slowly increasing the thrust of the cylinder. (In the second embodiment, only the third clutch 30' is set to "ON".)

(3) By performing the operation described in (2) above, power is transmitted to the output shaft in the order from the driver pulley, V-belt, driven pulley, intermediate shaft, third friction clutch and engaging members M2, M1.

Naturally, an automobile is started at the slowest speed range by the belt drive system. When the rotational speed of the engine increases, and consequently, the rotational speed of the output shaft increases, and the speed change range to be obtained by the belt system is at its highest (calculation must be performed on the basis of the output characteristic of the engine, the rotational speed of the output shaft, and the area ratio of a throttle), the third friction clutch 30 (or 30') is set to "OFF". Thereafter, the second friction clutch 20 (or 20') is set to "ON", whereby the drive system of the power transmission system can be switched to the direct drive system. Thereafter, first friction clutch is set to "OFF" so as to stop the V-belt.

In the second embodiment, the V-belt is not stopped. However, it runs idle with no load applied thereto. When speed is reduced, the area ratio of a throttle is made low. (Rotational speed of the engine and speed must be calculated at this time.). The drive system of the power transmissions system is switched to the highest speed range in the belt drive system and at the same time the second friction clutch is set to "ON", whereby so-called kick-down efficiency can be obtained.

We claim:

1. An adjustable speed transmission for driving an output shaft from an input shaft, said transmission comprising:
    a variable speed pulley drive mechanism;
    a first clutch for selectively connecting said pulley drive mechanism to an input drive shaft;
    a fixed speed ratio drive mechanism;
    a second clutch for selectively connecting said variable speed pulley drive mechanism to said fixed speed ratio drive mechanism; and
    a third clutch comprising means for selectively connecting the input drive shaft to said output shaft with said second clutch disconnecting said fixed speed ratio drive mechanism from said variable speed pulley drive mechanism.

2. An adjustable speed transmission for driving an output shaft from an input shaft, said transmission comprising:
    a variable speed pulley drive mechanism;
    a first clutch for selectively connecting said pulley drive mechanism to an input drive shaft;
    a fixed speed ratio drive mechanism;
    a second clutch for selectively connecting said variable speed pulley drive mechanism to said fixed speed ratio drive mechanism;
    reversible gear means for driving said output drive shaft; and
    a third clutch comprising means for selectively connecting the input drive shaft to said reversible gear means with said second clutch disconnecting said fixed speed ratio drive mechanism from said variable speed pulley drive mechanism.

3. The adjustable speed transmission of claim 2 wherein said variable speed pulley drive mechanism includes a driver pulley and a driven pulley, each of said pulleys comprising an adjustable speed pulley.

4. The adjustable speed transmission of claim 2 wherein said clutches comprise friction clutches.

5. The adjustable speed transmission of claim 2 wherein said fixed speed ratio drive mechanism includes an intermediate shaft and said reversible gear means includes a drive portion rotatable with said intermediate shaft.

6. The adjustable speed transmission of claim 2 wherein said fixed speed ratio drive mechanism includes an intermediate shaft and said reversible gear means includes a driver portion axially movably and rotatively fixedly mounted to said intermediate shaft.

7. The adjustable speed transmission of claim 2 wherein said reversible gear means includes a first gear continuously meshed with said fixed speed ratio drive mechanism, a second gear, and means for causing said second gear to selectively (a) drive said first gear for driving the output drive shaft in a first rotational direction, and (b) drive the output drive shaft in a second rotational direction opposite to said first direction.

8. The adjustable speed transmission of claim 2 wherein said variable speed pulley drive mechanism comprises an infinitely adjustable mechanism.

9. The adjustable speed transmission of claim 2 wherein said fixed speed ratio drive mechanism comprises a toothed belt drive.

10. The adjustable speed transmission of claim 3 wherein the reduction ratio of said driven pulley multiplied by the reduction ratio of said fixed speed ratio drive mechanism (JB2×JG) is in the range of $1 < JB2 \times JG \leq 1.7$.

11. An adjustable speed transmission comprising:
a variable speed pulley drive mechanism;
means for connecting said variable speed pulley drive mechanism to an input drive shaft for rotation therewith;
a fixed speed ratio drive mechanism;
a first clutch for selectively connecting said variable speed pulley drive mechanism to said fixed speed ratio drive mechanism; and
a second clutch comprising means for selectively connecting the input drive shaft to said fixed speed ratio drive mechanism with said first clutch disconnecting said fixed speed ratio drive mechanism from said variable speed pulley drive mechanism.

12. An adjustable speed transmission comprising:
a variable speed pulley mechanism;
means for connecting said variable speed pulley drive mechanism to an input drive shaft for rotation therewith;
a fixed speed ratio drive mechanism;
a first clutch for selectively connecting said variable speed pulley drive mechanism to said fixed speed ratio drive mechanism;
reversible gear means connected to said fixed speed ratio drive mechanism for driving an output drive shaft;
a second clutch comprising means for selectively connecting the input drive shaft to said fixed speed ratio drive mechanism with said first clutch disconnecting said fixed speed ratio drive mechanism from said variable speed pulley drive mechanism.

13. The adjustable speed transmission of claim 12 wherein said variable speed pulley drive mechanism includes a driver pulley and a driven pulley, each of said pulleys comprising an adjustable speed pulley.

14. The adjustable speed transmission of claim 12 wherein said clutches comprise friction clutches.

15. The adjustable speed transmission of claim 12 wherein said fixed speed ratio drive mechanism includes an intermediate shaft and said reversible gear means includes a driver portion rotatable with said intermediate shaft.

16. The adjustable speed transmission of claim 12 wherein said fixed speed ratio drive mechanism includes an intermediate shaft and said reversible gear means includes a driver portion axially movably and rotatively fixedly mounted to said intermediate shaft.

17. The adjustable speed transmission of claim 12 wherein said fixed speed ratio drive mechanism includes a cylindrical intermediate shaft rotatable concentrically about the input drive shaft, and said reversible gear means includes a driver portion rotatable with said intermediate shaft.

18. The adjustable speed transmission of claim 12 wherein said reversible gear means includes a first gear continuously meshed with said fixed speed ratio drive mechanism, a second gear, and means for causing said second gear to selectively (a) drive the output drive shaft in a first rotational direction, and (b) drive the output drive shaft in a second rotational direction opposite to said first direction.

19. The adjustable speed transmission of claim 12 wherein said variable speed pulley drive mechanism comprises an infinitely adjustable mechanism.

20. The adjustable speed transmission of claim 12 wherein said fixed speed ratio drive mechanism includes a cylindrical intermediate shaft rotatable concentrically about the input drive shaft, and said reversible gear means includes a driver portion rotatable with said intermediate shaft, said second clutch comprising means for selectively connecting said input drive shaft to said intermediate shaft.

21. The adjustable speed transmission of claim 12 wherein the reduction ratio of said driven pulley multiplied by the reduction ratio of said fixed speed ratio drive mechanism (JB2×JG) is in the range of $1 < JB2 \times JG \leq 1.7$.

22. A power transmission systems comprising:
two friction clutches mounted on a shaft extending from an engine output shaft;
a drive-side V-belt-type speed change pulley mounted on a cylindrical shaft extending from the output-side clutch member of one of the friction clutches;
a driven-side V-belt-type speed change pulley mounted on an intermediate shaft such that the pulleys face in parallel with each other;
a V-belt spanned between the pulleys;
a friction clutch provided on said intermediate shaft;
engaging members provided both on one of the cylindrical shaft on which the V-belt-type speed change pulley is not mounted, extending from the output-side clutch member of the friction clutch mounted on the engine output shaft and the cylindrical shaft extending from the output-side clutch member of said friction clutch mounted on the intermediate shaft so that engine power is transmitted to each other; and
a gear provided on the cylindrical shaft extending from the output-side clutch member of the friction clutch mount on the engine output shaft so that said gear faces with a gear mounted on the output shaft of said power transmission system and power is transmitted from said gear to the gear mounted on the engine output shaft.

23. The power transmission system of claim 22 wherein the reduction ratio of said driven pulley multiplied by the reduction ratio of said engaging members (JB2×JG) is in the range of $1 < JB2 \times JG \leq 1.7$.

24. The power transmission system of claim 22 wherein the friction clutch comprises an input-side clutch member consisting of cylindrical members having terraced surfaces, mounted concentrically on respective shafts, a pressure chamber formed in the cylindrical member having a terraced surface, a sliding member which is slidably housed in the friction clutch, an output-side clutch member consisting of supporting members having terraced surfaces which are provided on respective shafts, through a bearing, opposite to said input-side clutch member such that said output-side clutch member is rotatable and integral with respective shafts in the direction of thrust, and a plurality of friction discs which are engaged with splines or key grooves which are mounted both on the inner circumference of the cylindrical portion of the cylindrical member having a terraced surface and on the outer circumference of the cylindrical portion of the supporting member having a terraced surface such that the friction discs mounted on the inner circumference of the cylindrical portion of the cylindrical member and the friction discs mounted on the outer circumference of the cylindrical portion of the supporting member are adjacently and alternately disposed in the space between the inner wall of the cylindrical member having a terraced surface and the sidewall of the supporting member having a terraced surface.

25. The power transmission system as claimed in claim 22 wherein said engaging member mounted on the cylindrical shaft extending from the output-side clutch member of the friction clutch comprises one of a sprocket, a toothed pulley for a toothed belt, and a V-pulley, a chain being used for the sprocket, a toothed belt being used for the toothed belt, and a V-belt being used for the V-pulley to permit power to be transmitted by these members.

26. The power transmission system as claimed in claim 22 wherein said engaging member mounted on the cylindrical shaft extending from the output-side clutch member of the friction clutch comprises one of a sprocket, a toothed pulley for a toothed belt, and a V-pulley, a chain being used for the sprocket, a toothed belt being used for the toothed belt, and a V-belt being used for the V-pulley to permit power to be transmitted by these members.

27. The power transmission system of claim 22 further including a first gear provided, through a bearing, on the output-side cylindrical shaft extending from the friction clutch mounted on the shaft extending from the engine output shaft such that said gear is free to rotate with respect to said cylindrical shaft, a second gear or a clutch disposed adjacently to said gear, and a third gear, having a gear of a clutch mounted adjacently to said second gear, provided on said cylindrical shaft such that said gear is free to rotate in the direction of thrust and integral with said cylindrical shaft in the direction of rotation, whereby both gears can selectively engage with a gear provided on the power transmission system.

28. The power transmission system of claim 22 further including the V-pulley so that power is transmitted.

29. A power transmission system comprising:
a driver pulley and a driven pulley;
a belt trained about said pulleys;
a clutch connected to the driver pulley;
a clutch connected to the driven pulley;
shafts extending one each from each of said clutches; and
engaging members which engage one each with the shaft extending from the corresponding clutch connected to the driver pulley and the driven pulley.

30. The power transmission system of claim 29 wherein the reduction ratio of said driven pulley multiplied by the reduction ratio of said engaging members (JB2×JG) is in the range of $1 < JB2 \times JG \leq 1.7$.

31. The power transmission system of claim 29 further including a normal/reverse rotation changeover gear.

32. A power transmission system comprising:
a driver V-belt type speed change pulley mounted on said intermediate shaft such that the driven V-belt type speed change pulley confronts with the driver V-belt-type speed change pulley;
a V-belt spanned between both V-belt-type speed change pulleys;
friction clutches mounted on both the input drive shaft and the intermediate shaft and having output shafts;
engaging members mounted on said output shafts extending from output-side clutch members of said friction clutches such that power is transmitted between said engaging members; and
a gear on the cylindrical shaft extending from the output-side friction member of said friction clutch mounted on the input drive shaft so that said gear faces a gear mounted on the output shaft of the power transmission system and power is transmitted by means of said gears.

33. An adjustable speed transmission for driving an output shaft from an input shaft, said transmission comprising:
a variable speed pulley drive mechanism;
a fixed speed ratio drive mechanism;
a reversible gear drive mechanism; and
clutch means for selectively connecting said drive mechanism in series between an input shaft and an output shaft comprising at least three clutches.

34. The power transmission system of claim 29 further including a normal/reverse rotation changeover gear.

* * * * *